United States Patent [19]
Miller et al.

[11] 3,727,736
[45] Apr. 17, 1973

[54] ARMATURE ASSEMBLY FOR AN ELECTROMAGNETIC CLUTCH

[75] Inventors: Donald L. Miller, Horseheads; John F. Puro, Elmira, both of N.Y.

[73] Assignee: The Bendix Corporation, Southfield, Mich.

[22] Filed: Sept. 29, 1971

[21] Appl. No.: 184,750

[52] U.S. Cl. ............................................. 192/84 C
[51] Int. Cl. ............................................. F16d 27/10
[58] Field of Search ............... 192/84 R, 84 A, 84 AA, 192/84 B, 84 C; 188/163

[56] References Cited

UNITED STATES PATENTS

| 3,368,657 | 2/1968 | Wrensch et al. | 192/84 C |
| 3,189,150 | 6/1965 | Chapman | 192/84 A |
| 3,022,876 | 2/1962 | Frankel | 192/84 C |
| 3,327,822 | 6/1967 | Spencer | 192/84 C X |
| 3,205,989 | 9/1965 | Mantey | 192/84 C |

FOREIGN PATENTS OR APPLICATIONS

| 537,461 | 3/1922 | France | 192/84 A |

*Primary Examiner*—Allan D. Herrmann
*Attorney*—Bruce A. Yungman et al.

[57] ABSTRACT

An apparatus to substantially eliminate audible noise in electromagnetic shaft coupling devices having input and output torque transmitting members is disclosed which utilizes an armature assembly comprising an annular armature member having a slot extending fully through a radial segment thereof, and a flexible coupling rotatably mounted to the armature such that the armature is suspended thereby, which assembly permits the armature to twist and flex independently of both torque transmitting members thereby lowering the resonant frequency during torque transmission. The improved armature assembly conforms to magnet body pole face irregularities, eliminates backlash, and reduces the run-in time required to reach design torque.

4 Claims, 3 Drawing Figures

ARMATURE ASSEMBLY FOR AN ELECTROMAGNETIC CLUTCH

FIELD OF THE INVENTION

This invention relates to electromagnetic shaft coupling devices which are often used as a means to transfer kinetic energy from one rotatable assembly to another rotatable or fixed assembly, and more particularly to magnetic clutches and brakes which produce undesirable audible noise during engagement and disengagement.

BRIEF DESCRIPTION OF THE PRIOR ART

The noise generated by the armature assembly of a clutch or brake is usually associated with the resonant frequency of the armature assembly. The resonant frequency, that is the frequency at which a given system or object will respond with maximum amplitude when driven by an external force of constant amplitude, is dependent upon the mass, geometry, and flexibility of the system. Many prior art devices comprising combinations of materials, grooves, cuts, etc., have attempted to reduce engagement noise. Inasmuch as these prior art devices tend to dampen the vibrations that cause sound, instead of eliminating the sound-producing vibrations, they are only partly successful. For example, one previous method to reduce electromagnetically induced vibrations is described in U.S. Pat. No. 3,586,145, wherein a plurality of thin armature discs are rotationally secured to and axially slidable on an armature hub. The combination of frictional damping (resulting from one armature disc sliding against an adjacent armature disc) and the altered resonant frequency of the armature assembly (resulting from dividing a single fixed armature disc into a number of thin armature discs) taught by this invention reduced audible armature noise during engagement and disengagement. However, in order to reduce the mass and therefore alter the resonant frequency, and in order to maintain the desired flexibility, the thickness of the disc stack must be kept relatively small. When the thickness of the disc stack is decreased, the magnetic flux is also substantially decreased resulting in decreased transmitted torque. Also, with this method the armature geometry is not sufficiently changed to substantially affect clutch "run-in" time.

Another prior art device described in U.S. Pat. No. 3,368,657, reduced the inherent noise by cutting a single-armature disc perpendicularly to the plane of the armature in order to divide the armature disc into component parts or segments. Such a method changed the relative mass by an infinitesimal amount, while the corresponding change in geometry resulted in a more favorable resonant frequency. This prior art design had several disadvantages however. First, since the armature was splined directly to one of the torque transmitting shafts, it was limited to a relatively minor axial deflection, this substantially rectilinear deflection made possible only along the locus of the cut. That is, the complementary splines of armature and hub kept the inner periphery of the armature relatively rigid thereby prohibiting any twisting or tilting of the armature about its axis. Thus, the undesirable vibrations were only slightly damped. Secondly, by providing a flux return path through the spline, the flexibility of the armature was further restrained, and the armature transmitting capacity of the clutch was adversely affected. Thirdly, the spline connection taught by this prior art device produces "backlash" whenever the armature is engaged and/or disengaged. Of course, the cost of cutting splines into both armature and the hub member made the overall manufacture of the clutch more expensive.

When electromagnetic clutches of the type mentioned above are used in an art such as the automotive art, the high volume of production places particular emphasis upon simplicity and economy of construction as well as durability of design. Also, the elimination of noise in clutches used in automobiles is understandably very important.

Previous armatures known in the art usually necessitated a "run-in" and/or "wear-in" period during initial operation. An extended "run-in" period was usually required with solid disc armatures because the adjacent coupling surfaces were not perfectly flat and parallel. The amount of flexibility was limited and therefore these solid armatures did not allow for effective contact with the mating surface after assembly. In order to provide a greater area of surface contact between the two coupling surfaces thereby reducing the initial "wear-in" time, additional manufacturing operations were required which resulted in higher costs. If the clutch torque-transmitting surfaces are not made substantially flat and parallel one to another, the clutch "run-in" time to reach design torque is also undesirably increased.

SUMMARY OF THE INVENTION

It is, therefore, a primary object of this invention to provide an armature assembly for an electromagnetic clutch or brake that solves the problems associated with audible noise, inflexibility, high manufacturing costs, and unfavorable clutch wear-in and clutch run-in time. Pursuant to this object, an armature assembly is provided comprising an annular armature member having a slot extending fully through a radial segment thereof, and a torque transmitting flesible coupling rotatably secured to the armature for rotation therewith, said coupling freely suspending the armature from limiting contact with the couplings associated torque transmitting member.

Another object of this invention is to control and substantially eliminate the audible armature noise associated with electromagnetic coupling devices during engagement and disengagement. In accordance with this object, an armature assembly is provided wherein the armature member is permitted to freely bend, twist and flex about its axis thereby substantially lowering the resonant frequency of the assembly.

It is still another object of this invention to provide a durable armature assembly for an electromagnetic clutch of simple design which easily lends itself to more economical construction than did similar prior art designs.

It is another object of this invention to provide a torque transmitting armature assembly for an electromagnetic clutch which reduces vibrations and shock loads due to its soft engaging characteristics.

Another object of this invention is to provide an armature assembly that reduces the initial wear-in period after the electromagnetic clutch or brake is assembled.

Another object of this invention is to provide an armature assembly that does not require as much run-in time to reach design torque since the torque transmitting frictional members do not have to be made as flat.

It is yet another object of this invention to provide an armature assembly for an electromagnetic clutch or brake which is sufficiently flexible to conform to pole face irregularities thereby substantially lowering the resonant frequency.

It is another object of this invention to provide an armature assembly for an electromagnetic clutch or brake that eliminates audible noise upon clutch engagement without affecting the magnetic flux path so that design torque may be easily reached.

It is still another object of the present invention to provide a novel armature assembly for an electromagnetic clutch or brake which substantially reduces both audible noise and unwanted eddy current in the armature. It is another object of this invention to provide a novel noise-free electromagnetic clutch design which does not significantly reduce the mechanical strength of the magnetic members nor significantly reduce their torque transmitting capabilities.

Yet another object of this invention is to provide a noise controlling armature assembly for brakes, clutches and the like that substantially eliminates the unfavorable sound-producing vibrations rather than dampen the vibrations that cause unwanted sound as did prior art devices.

Additional objects and advantages will be readily apparent from the following description taken in conjunction with the accompanying figures of one embodiment of the present invention.

DETAILED DESCRIPTION OF THE PREFERRED EMBODIMENT

Figure 1:
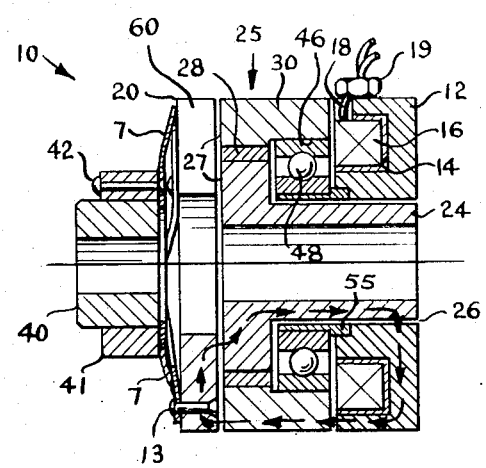
FIG. 1 is a schematic cross-sectional view of a typical electromagnetic clutch incorporating my invention taken along the section 1–1 shown in FIG. 2.

Referring to FIG. 1, a single-surface stationary field electromagnetic clutch is shown, designated generally by the reference numeral 10. Although this type of clutch has been chosen for purpose of illustration, it should be understood by those knowledgeable in the art that my invention can also be utilized with equal effectiveness in any electromagnetic friction coupling wherein quiet engagement and disengagement is desired.

Flexible coupling 7 is mounted to a mounting hub 41 by means of a plurality of bolts 42 which are inserted through holes in coupling 7. Mounting hub 41 is press fitted onto first torque transmitting member, power shaft 40. Coupling 7 may also be aptly termed a torque transmitting diaphragm and/or an armature return spring, since it serves both of these functions. That is, all torque transmitted between power shaft 40 and armature 20 or vice versa must be carried through the flexible coupling 7. Also, when the clutch is disengaged coupling 7 serves to withdraw armature 20 from its contact with the second torque transmitting member 25. Although only one method of mounting coupling 7 to hub 40 is shown, other methods known in the art could also be used, for example, staking, welding, riveting, etc.

An annular armature 20 of magnetic flux conducting material is rotatably secured to the flexible coupling 7 by means of a plurality of fivets 13. Those skilled in the art will appreciate that here again, other methods of securing armature 20 to coupling 7 could be used with equal effectiveness. Armature 20 has axially extending mutually spaced free faces 60 and 70 formed by cutting a substantially radial slot 50 (shown in FIG. 2) fully through a radial segment of armature 20, thus giving the armature the form of a split disc. Although only one type of cut 50 through armature 20 is shown, this cut being rectilinear and along a plane perpendicular to the disc, a slot of almost any configuration cut on almost any angle relative to the plane of the armature that extends fully through a radial segment of armature 20 will also yield the desired performance. Of course, the more simple the cut made through armature 20, the less expensive the armature and, therefore, the clutch will be.

The clutch of the present invention is reversible with respect to input and output sides and thus, clutch structure which in one installation would be an input member in another installation would be an output member. Accordingly, rotating input and output members are referred to generically in the following description as first and second torque transmitting members. It is also immaterial to the invention whether the armature is used in a brake or a clutch. There is no significant difference between brakes and clutches of this character, from the standpoint of the invention here involved. The instant device is a clutch only because both of the frictionally engaged elements are rotatable. If one were fixed against rotation, it would function as a brake.

My clutch further includes fixed or stationary magnet body 12 adapted to be secured to a fixed mounting structure (not shown) and fabricated of magnetic flux conducting material such as iron or steel. Magnet body 12 is formed to provide an annular recess or cavity 14 within which is mounted an electromagnetic coil 16 which may be secured in the cavity by epoxy or other conventional means. Coil 16 has leads 18 extending radially upwardly as viewed in the drawing where they may be connected to a controlled power source or control circuit (not shown) through the connector 19.

Juxtaposed and coaxially aligned with armature 20 is a second torque transmitting member 25 which consists of three integral subparts. First a generally cylindrical flux conducting member 24 defines the radially inner confine of the clutch and extends axially so that one end is concentric with magnet body 12 but having a small but definite radial air gap 26 therebetween. An annular ring 28 of magnetically nonconducting material such as brass or the like forms a second subpart of the second torque transmitting means 25 and is integrally secured to cylindrical member 24. A third and radially outermost annular member 30 is also comprised of magnetic flux conducting material and is integrally secured to the ring 28 so that second torque transmitting means 25 is a laminated member having radially inner and outer magnetic flux conducting portions and an intermediate nonflux conducting section. It will be apparent that magnetic flux is inhibited from travelling radially through the second torque transmitting member 25 but may travel in a general axial direction through both the inner cylindrical member 24 and the outer annular member 30. The inner radial edge of annular ring 30 has a groove 46 forming a seat for the outer race of bearing 48 which, in turn, is supported at its inner race by non-magnetic sleeve 55 which is brazed or otherwise secured to magnet body 12. The three laminated sections of second torque transmitting members 25 may be integrally secured in various conventional ways such as, e.g., drilling and tapping an oversized screw hole that overlaps all three sections and inserting a screw (not shown).

Figure 2:
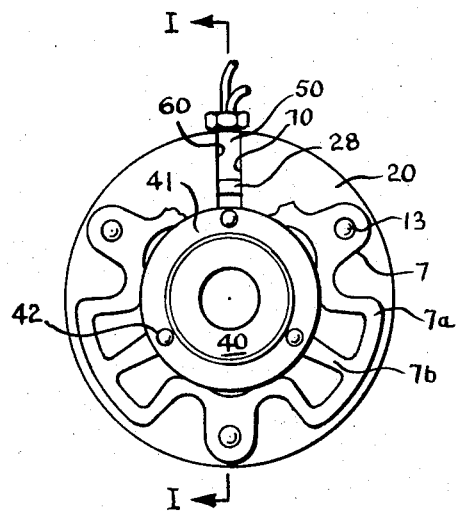
FIG. 2 is a left-end view of the electromagnetic clutch shown in FIG. 1 with part of the flexible coupling member broken away.

Referring to FIG. 2, an end view of my novel armature assembly is shown with a portion of the flexible coupling 7 broken away. Flexible coupling 7 is the subject of a separate commonly assigned copending patent application U.S. Ser. No. 158,353. Of course, other flexible couplings which maintain circumferential rigidity under torsional load while simultaneously providing a highly flexible axial extension characteristic such as the coupling disclosed in commonly assigned copending patent application U.S. Ser. No. 158,352 could also be used. The coupling or diaphragm 7 is fabricated from thin resilient steel sheets in a simple punch press operation. Diaphragm 7 is essentially comprised of two principal parts: an inner ring member having a plurality of radially extending arms 7b, said ring being adaptable for fastening to the mounting hub 41 by means of a plurality of bolts 42; and a plurality of generally W-shaped connecting arms 7a disposed between the radially extending arms 7b and connected thereto, said arms 7a being adaptable for fastening to armature 20 by means of rivets or screws 13. The W-shaped connecting arms 7a are each substantially uniform in width so to evenly spread the stresses throughout the diaphragm when under torsional load for either possible direction of clutch rotation. With this diaphragm design, there is less tendency to distort under torsional load, and, therefore, the effective life and performance of the diaphragm is greatly increased.

With the use of the type of flexible coupling described above, the resilient connecting arms radially lengthen the amount necessary to compensate for axial movement of the armature when the clutch is engaged and disengaged. It is important to note that with these type of couplings, the mutual axially extending faces 60 and 70 formed by slot 50 in armature 20 may be axially displaced one from the other upon clutch engagement to conform to pole face irregularities of second torque transmitting means 25 without sacrificing any torque transmission capability. (The pole faces 27 of clutch 10 are formed by the radially extending faces of annular members 24 and 30.)

Figure 3:
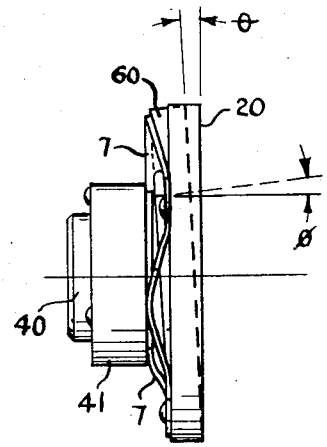
FIG. 3 is a side elevational view of my novel armature assembly shown in an exagerated flexed position.

Referring to FIG. 3, my novel armature assembly is shown in an exaggerated flexed position with the axially extending face 60 being displaced an angle $\theta$ from the plane formed by the torque transmitting face of armature 20 when in its at-rest position as shown in FIG. 1. Since the armature 20 is freely suspended by the flexible coupling 7, the inner periphery of armature 20 is permitted to flex an angle $\phi$ from its normal plane which is parallel to the axis of the clutch. Thus, armature 20 is permitted to bend, twist and flex about its axis in the planes perpendicular and parallel to the axis of the clutch while the flexible coupling member 7 maintains the armature's circumferential rigidity.

The new and novel armature assembly formed by flexible coupling 7 and armature 20 substantially eliminates the sound-producing vibrations in at least two ways. First, since the armature is highly flexible, it easily conforms to pole face irregularities, thereby reducing "bounce" which is one source of noise. Secondly, since armature 20 is flexible about several planes, the friction forces along the armature are permitted to be unequal, thus resonance is less likely to occur. Of course, since armature 20 is freely suspended by the coupling 7, the hub member 40 does not prohibit the armature from flexing. Also, the combination of the coupling member 7 and the armature 20 practically eliminates backlash.

By cutting the radial slots 50 completely through armature 20 another unexpected benefit is obtained. In accordance with Lenz' law the eddy current created upon energization of coil 16 in the magnetic clutch members produces a countermagnetic flux which tends to oppose the building of the magnetic field. This eddy current and its corresponding opposing flux, greatly decreases the time response of the electromagnetic clutch upon engagement. The slot 50 formed in armature 20 completely prohibits an eddy current from developing in armature 20 thereby decreasing clutch response time while having only a minimal effect upon the magnetic field. Practically all the flux is carried through armature 20 with only an infinitesimal flux loss dispersed through coupling 7.

OPERATION OF THE PREFERRED EMBODIMENT

The clutch as illustrated in FIG. 1 is shown in the disengaged position whereby the first and second torque transmitting members 40 and 25 respectively are frictionally uncoupled. Electrical power is supplied through lead 18 to coil 16 which generates an electromagnetic field following the path illustrated by the arrows in FIG. 1. This flux travels in a loop through the magnet body 12, axially through the outer annular member 30, jumping the axial air gap between armature 20 and the pole face 27 to armature 20. From thence, the flux travels radially inwardly of the armature plate where it again jumps the air gap between the armature and the second torque transmitting means, passing through cylindrical member 24, the radial air gap 26, back to the magnetic body 12. The magnetic flux pulls the armature 20, which is assumed to be rotating, into contactive engagement with the pole faces 27 of clutch 10. Thus, torque is transmitted from the first torque transmitting member, power shaft 40, through flexible coupling 7 and armature 20 to the second torque transmitting member 25. When the circuit to coil 16 is interrupted, the flux decays, permitting flexible coupling 7 to retract armature 20 from the second torque transmitting member 25, thus permitting relative motion between first and second torque transmitting members.

The flexibility of the disclosed armature assembly, in addition to the advantages noted above, allows for a greater area of initial surface contact between the mating surfaces of armature 20 and the pole faces 27 which reduces the time required for the stable operation of the coupling thereby eliminating the necessity of clutch wear-in. Since the pole faces 27 of my clutch 10 do not have to be made as flat as prior art designs, clutch run-in time to reach design torque is greatly decreased. Those skilled in the art will appreciate that unlike many prior art devices, a novel noise-free electromagnetic clutch is shown herein that maintains both the mechanical strength of the magnetic members and their ability to transmit torque without creating any destructive stresses.

While only one preferred embodiment of the invention has been disclosed, it will be apparent to those skilled in the art that changes may be made to the invention as set forth in the appended claims, and, in some cases, certain features of the invention may be used to advantage without corresponding use of other features. For example, by making a diametrical cut through armature 20 thus dividing the armature into two semi-circular segments and fixedly securing these segments to the type of diaphragm illustrated in copending patent application, Ser. No. 158,352, the two freely suspended segments will be able to twist and flex independent of each other according to the teachings of my invention. Accordingly, it is intended that the illustrative and descriptive materials herein be used to illustrate the principles of the invention and not to limit the scope thereof.

We claim:

1. An electromagnetic friction device comprising:
   a first rotatable torque transmitting member;
   a torque transmitting flexible coupling rotatably mounted to the first torque transmitting member;
   an annular armature member rotatably secured to said flexible coupling and being suspended thereby, said armature having at least one slot formed therein, said slot extending fully through a radial segment thereof;
   a second rotatable torque transmitting member juxtaposed and coaxially aligned with the armature, said second torque transmitting member being axially spaced from the armature a predetermined distance; and
   an electromagnetic means operatively disposed to generate an annular flux loop to selectively engage and disengage the armature and the second torque transmitting member.

2. An electromagnetic clutch or brake as recited in claim 1 wherein said electromagnetic means comprises:
   a coil of wire;
   means to control current flow through said coil of wire; and
   annular magnetic material with an annular channel for said coil of wire whereby a magnetic field is produced in said annular magnetic material when current flows through said coil of wire.

3. An electromagnetic clutch or brake assembly as recited in claim 1 wherein the flexible coupling includes resilient connecting means, said connecting means being adaptable to radially lengthen the amount necessary to compensate for axial movement of the armature.

4. The combination as recited in claim 3 wherein the resilient connecting means is fixedly secured to the armature such that the axially extending faces of the armature formed by the slot may be axially displaced one from the other upon energization of the electromagnetic means.

* * * * *